United States Patent
Fukuda et al.

(10) Patent No.: US 9,606,347 B2
(45) Date of Patent: Mar. 28, 2017

(54) MICROSCOPE

(71) Applicant: OLYMPUS CORPORATION, Shibuya-ku, Tokyo (JP)

(72) Inventors: Tatsushi Fukuda, Tokyo (JP); Hiroyasu Hebiishi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/608,979

(22) Filed: Jan. 29, 2015

(65) Prior Publication Data

US 2015/0212310 A1  Jul. 30, 2015

(30) Foreign Application Priority Data

Jan. 30, 2014 (JP) ................... 2014-015828

(51) Int. Cl.
*G02B 21/33* (2006.01)
(52) U.S. Cl.
CPC .................... *G02B 21/33* (2013.01)
(58) Field of Classification Search
CPC ........................ G02B 21/33; G01N 2021/151
USPC ................................................. 359/368, 391
See application file for complete search history.

(56) References Cited

U.S. PATENT DOCUMENTS

| | | | | |
|---|---|---|---|---|
| 8,947,776 B2* | 2/2015 | Terada | ................ | H01L 21/6838 359/391 |
| 9,291,546 B2* | 3/2016 | Nakasho | ................ | G01N 21/01 |
| 2006/0164616 A1* | 7/2006 | Okada | ................ | G02B 21/33 355/53 |
| 2007/0127135 A1* | 6/2007 | Nagasaka | .............. | G02B 21/33 359/665 |
| 2007/0291354 A1* | 12/2007 | Harada | .................... | B01L 7/00 359/395 |
| 2007/0291360 A1* | 12/2007 | Pirsch | .................... | G02B 21/02 359/509 |
| 2008/0152190 A1* | 6/2008 | Harada | .................. | G02B 21/33 382/100 |
| 2008/0170292 A1* | 7/2008 | Harada | ................ | G02B 21/248 359/391 |

(Continued)

FOREIGN PATENT DOCUMENTS

| | | |
|---|---|---|
| EP | 1855140 A1 | 11/2007 |
| JP | 2004070307 A | 3/2004 |

(Continued)

OTHER PUBLICATIONS

Extended European Search Report dated Jul. 14, 2015, issued in counterpart European Application No. 15152836.1.

*Primary Examiner* — Frank Font
(74) *Attorney, Agent, or Firm* — Holtz, Holtz & Volek PC

(57) ABSTRACT

It is an object of the present invention to provide a microscope that is capable of precisely controlling the amount of an immersion medium held in a gap between an objective lens and a mounting part, and that is capable of observing a specimen without varying the mounting part. The microscope includes a supply port from which an immersion medium is supplied to a gap between a film-like mounting part on which a specimen is loaded and an immersion objective lens, and a suction port that is arranged so as to be able to be brought into contact with an immersion medium supplied from the supply port, and from which the immersion medium can be sucked.

3 Claims, 5 Drawing Sheets

(56) References Cited

U.S. PATENT DOCUMENTS

| | | | | |
|---|---|---|---|---|
| 2008/0252967 A1* | 10/2008 | Tomioka | ............... | G02B 21/33 359/398 |
| 2008/0259327 A1* | 10/2008 | Brueck | ............... | G02B 21/33 356/237.5 |
| 2008/0259446 A1* | 10/2008 | Komatsu | ............... | G02B 21/33 359/391 |
| 2009/0092925 A1* | 4/2009 | Omura | ............... | G02B 1/06 430/311 |
| 2009/0251691 A1* | 10/2009 | Shibata | ............... | G02B 21/33 356/237.5 |
| 2010/0027109 A1* | 2/2010 | Liebel | ............... | G02B 21/24 359/381 |
| 2010/0103510 A1* | 4/2010 | Kimura | ............... | G02B 21/248 359/381 |
| 2011/0094318 A1* | 4/2011 | Hellmich | ............... | G02B 21/32 73/863 |

FOREIGN PATENT DOCUMENTS

| | | |
|---|---|---|
| JP | 2005234457 A | 9/2005 |
| WO | 2005010591 A1 | 2/2005 |

* cited by examiner

MICROSCOPE

CROSS-REFERENCE TO RELATED APPLICATIONS

This application is based on Japanese Patent Application No. 2014-015828, the contents of which are incorporated herein by reference.

TECHNICAL FIELD

The present invention relates to a microscope.

BACKGROUND ART

Heretofore, there is known a microscope in which a cover glass on which a specimen is loaded is mounted on a stage, and an immersion medium is supplied to a gap between an objective lens that comes close the cover glass from below and the cover glass (refer to Patent Literature 1, for example).

The microscope is provided with a saucer in a periphery of the objective lens. If an immersion medium supplied from a water supply nozzle is spilled from the gap between the objective lens and the cover glass, the immersion medium flowing to the periphery of the objective lens is received by the saucer and discharged.

CITATION LIST

Patent Literature

{PTL 1}
Japanese Unexamined Patent Application, Publication No. 2004-70307

SUMMARY OF INVENTION

Technical Problem

The present invention is made in light of the above-mentioned circumstances, and it is an object to provide a microscope that is capable of precisely controlling the amount of an immersion medium held in a gap between an objective lens and a mounting part, and of observing a specimen without varying the mounting part.

Solution to Problem

The present invention provides solutions below.

One aspect of the present invention is a microscope that includes a supply port from which an immersion medium is supplied to a gap between a film-like mounting part on which a specimen is loaded and an immersion objective lens, and a suction port that is arranged so as to be able to be brought into contact with the immersion medium supplied from the supply port, and from which the immersion medium can be sucked.

According to the present aspect, it is possible to force the immersion medium supplied to the gap between the film-like mounting part and the immersion objective lens from the supply port to be discharged from the gap between the mounting part and the immersion objective lens after the immersion medium is sucked through the suction port. As a result, it is possible to precisely control the amount of the immersion medium to be held in the gap between the immersion objective lens and the mounting part by adjusting the amount of supply from the supply port and the amount of suction from the suction port. Thus, even if the film-like mounting part is so thin as to be varied with the amount of the immersion medium, it is possible to observe a specimen while a position change of the specimen is prevented.

DESCRIPTION OF EMBODIMENTS

With reference to the accompanying drawings, a microscope 1 in accordance with one embodiment of the present invention will be described.

Figure 1:
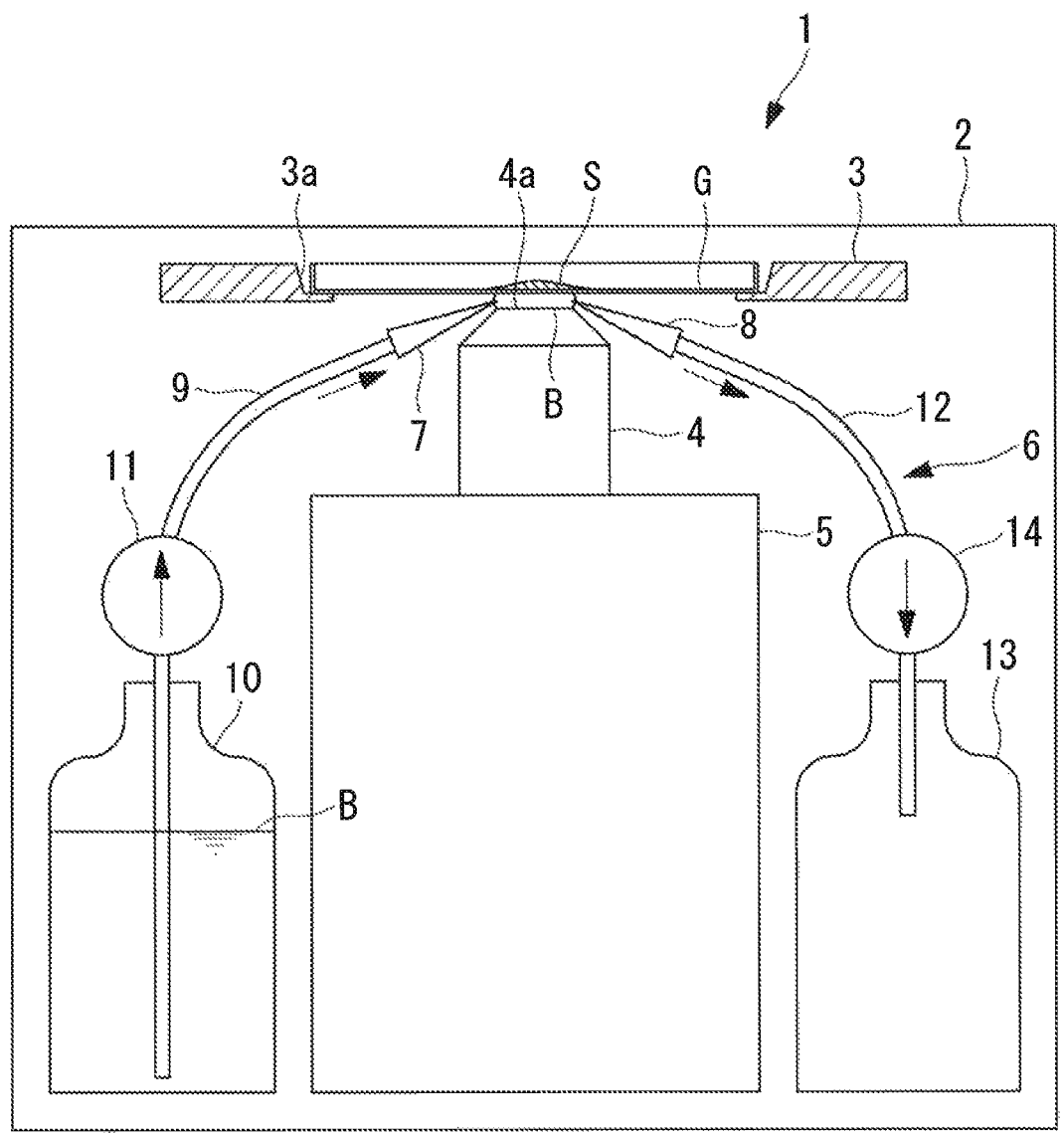
FIG. 1 is a schematic diagram showing a structure of a microscope in accordance with one embodiment of the present invention.

As shown in FIG. 1, the microscope 1 in accordance with the present embodiment is provided with a case 2 in which temperature and humidity are controlled, and the microscope 1 includes the following in the case: a stage 3 on which a specimen S is loaded; a microscope body 5 provided with an immersion objective lens 4 that is arranged upward so as to be close to a lower side of the stage 3; and a medium supply-discharge device 6 for supplying an immersion medium B such as pure water to the gap between the immersion objective lens 4 and the specimen S and for discharging the immersion medium B therefrom.

The specimen S is mounted on the stage 3 in a state where the specimen S is loaded on a mounting part G composed of a film-like transparent plastic. The stage 3 is provided with an opening 3a through which the specimen S is irradiated from below over the immersion medium B and the mounting part G on the stage 3 with illumination light from the microscope body 5 condensed by the immersion objective lens 4.

The immersion objective lens 4 is composed a combination of a large number of lenses (not shown). When the immersion medium B is injected into a gap between a top face 4a of the top of the immersion objective lens 4 and the mounting part G, the immersion medium B is held in the gap by surface tension.

Figure 2:
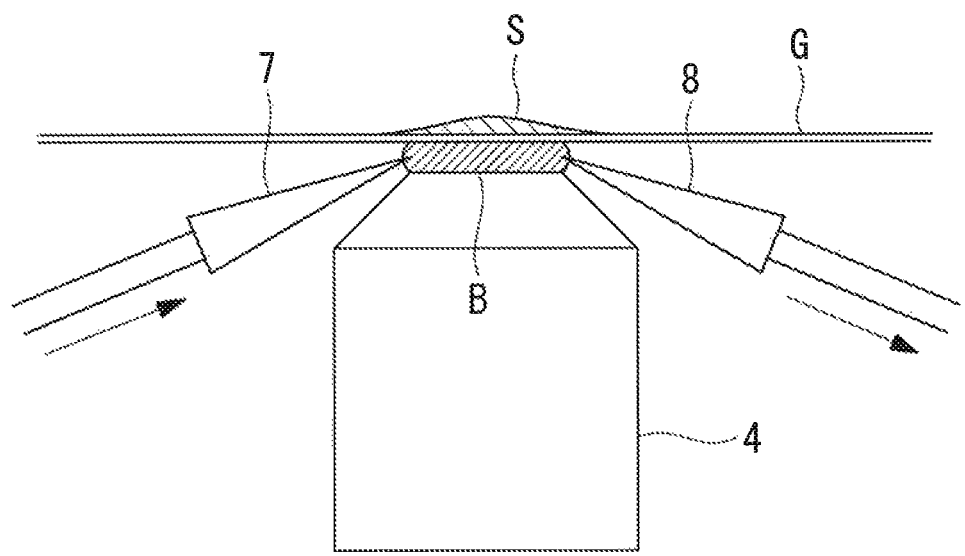
FIG. 2 is a partially enlarged view of near an immersion objective lens and a mounting part of the microscope shown in FIG. 1.

As shown in FIG. 2, the medium supply-discharge device 6 includes a supply nozzle (supply port) 7 and a suction nozzle (suction port) 8 whose tips are arranged in the gap between the mounting part G and the immersion objective lens 4. Each of the supply nozzle 7 and the suction nozzle 8 is provided at its tip with an opening through which the immersion medium B is supplied or sucked. The tips of the supply nozzle 7 and the suction nozzle 8 are arranged at positions 180° apart around an optical axis of the immersion objective lens 4 to face each other.

As shown in FIG. 1, a liquid supply container 10 is connected to a base end of the supply nozzle 7 through a pipe 9 in the middle of which a supply pump (supply part) 11 is arranged to feed the immersion medium B contained in the liquid supply container 10. In addition, a waste liquid container 13 is connected to a base end of the suction nozzle 8 through a pipe 12 in the middle of which a suction pump (suction part) 14 is arranged to feed the immersion medium B to the waste liquid container 13.

Operation of the microscope 1 in accordance with the present embodiment configured as above will be described.

In order to observe the specimen S with the microscope 1 in accordance with the present embodiment, in a state where the mounting part G on which the specimen S is loaded is mounted at a position corresponding to the opening 3a of the stage 3, and where the immersion objective lens 4 is arranged vertically below the mounting part G at an interval, the medium supply-discharge device 6 is operated to supply the immersion medium B into the gap between the mounting part G and the immersion objective lens 4.

The supply pump 11 of the medium supply-discharge device 6 is operated to enable the immersion medium B contained in the liquid supply container 10 to be supplied to the gap between the mounting part G and the immersion objective lens 4 through the pipe 9 and the supply nozzle 7 at a predetermined flow rate per unit of time. Thus, it is possible to accurately provide a predetermined amount of the immersion medium B in the gap between the mounting part G and the immersion objective lens 4 by operating only the supply pump 11 from a state where there is no immersion medium B in the gap between the mounting part G and the immersion objective lens 4.

In particular, in the present embodiment, the medium supply-discharge device 6 includes the suction pump 14 and the suction nozzle 8. Thus, even if the amount of the immersion medium B provided in the gap between the mounting part G and the immersion objective lens 4 is unknown, it is possible to accurately provide the predetermined amount of the immersion medium B in the gap between the mounting part G and the immersion objective lens 4 by operating the supply pump 11 after the whole amount of the immersion medium B is temporarily sucked by the suction nozzle 8 in a forced manner.

As a result, there is an advantage in which even if the mounting part G is so thin as to be deformed by pressure of the immersion medium B, the specimen S is prevented from being deviated in the optical axis direction by supplying the predetermined amount of the immersion medium B to enable the specimen S to be observed under the same condition.

In addition, it is also possible to prevent sticking of dried immersion medium B by reliably sucking the immersion medium B through the suction nozzle 8 after observation is finished to remove the immersion medium B remaining on the top face 4a of the immersion objective lens 4.

Figure 3:
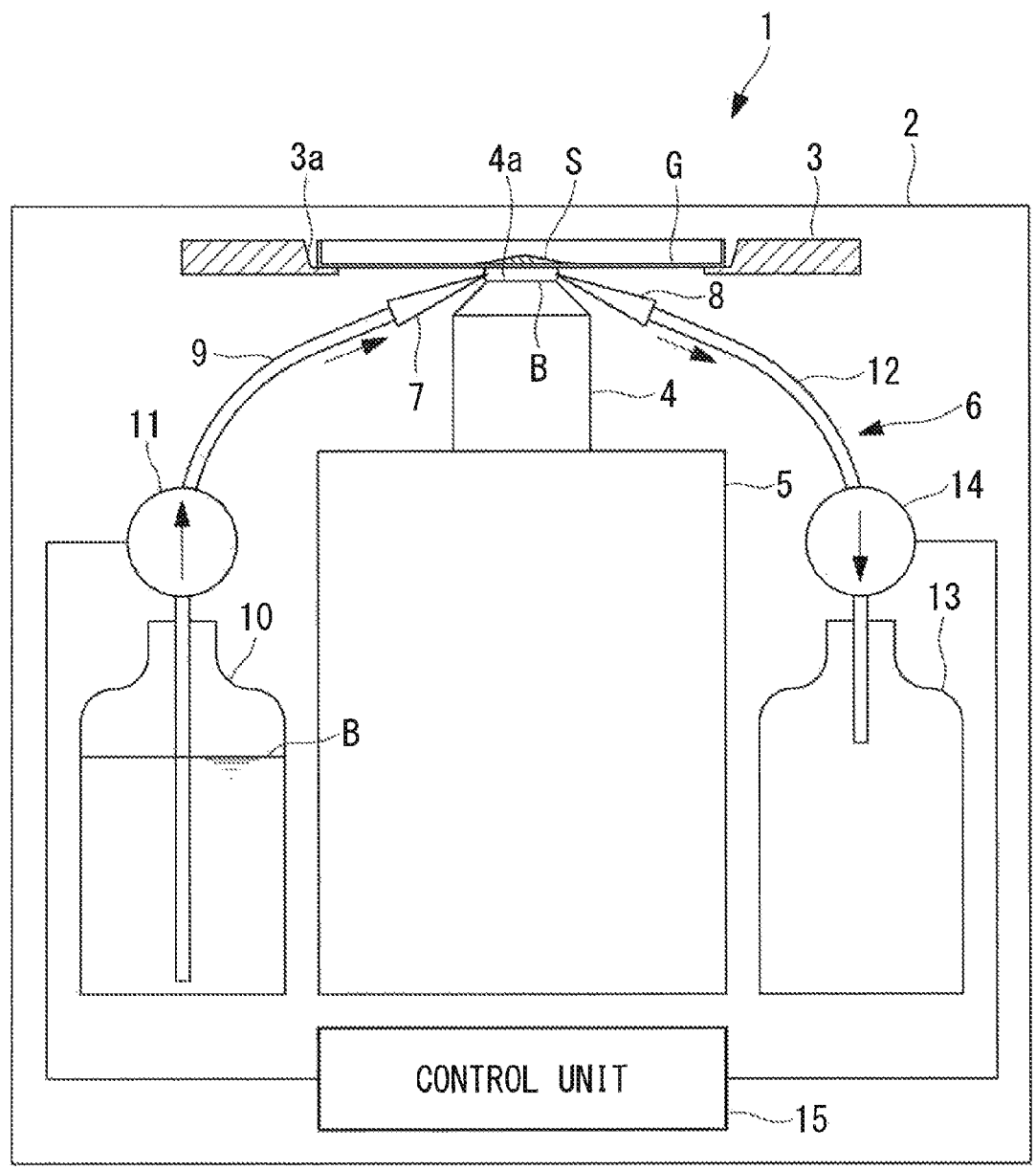
FIG. 3 is a schematic diagram showing a first variation of the microscope shown in FIG. 1.

As shown in FIG. 3, in the present embodiment, there may be provided a control unit 15 to be connected to the supply pump 11 and the suction pump 14 so that the control unit 15 may control the supply pump 11 and the suction pump 12.

For example, the control unit 15 first allows the supply pump 11 to operate to supply the predetermined amount of the immersion medium B into the gap between the mounting part G and the immersion objective lens 4, and next allows the supply pump 11 and the suction pump 14 to simultaneously operate so that the suction pump 14 may operate to suck the immersion medium B, which is supplied into the gap between the mounting part G and the immersion objective lens 4 by the supply pump 11 through the supply nozzle 7, from the gap between the mounting part G and the immersion objective lens 4 through the suction nozzle 8.

It is possible to allow the immersion medium B to flow in one direction in the gap between the mounting part G and the immersion objective lens 4 without varying the amount the immersion medium B supplied first by allowing the amount of supply by the supply pump 11 to equal the amount of suction by the suction pump 14. In a case where bubbles, dust, and the like are mixed into the immersion medium B, flowing of the immersion medium B washes the bubbles, dust, and the like away so that it is possible to easily remove the bubbles, dust, and the like from the gap between the mounting part G and the immersion objective lens 4. In particular, in a case where the immersion medium B is a liquid with high viscosity such as silicone, only supplying the immersion medium B allows formed bubbles to sometimes remain because the bubbles are enclosed by the immersion medium, however, allowing the immersion medium B to flow enables such inconvenience to be prevented from occurring.

The control unit 15 may be configured to allow the supply pump 11 and the suction pump 14 to simultaneously operate by providing a certain difference between the amount of supply by the supply pump 11 and the amount of suction by the suction pump 14 so that the immersion medium B provided into the gap between the mounting part G and the immersion objective lens 4 sequentially increases by a certain amount per unit of time.

In this manner, it is possible to allow first only the supply pump 11 to operate to supply only a predetermined amount less than a required amount into the gap between the mounting part G and the immersion objective lens 4, and allow next the supply pump 11 and the suction pump 14 to simultaneously operate to gradually increase the amount of the immersion medium B provided in the gap between the mounting part G and the immersion objective lens 4 up to the required amount. At this time, there is an advantage in which the control unit 15 can precisely control the amount of the immersion medium B by only controlling operation time of the supply pump 11 and the suction pump 14.

Figure 4:
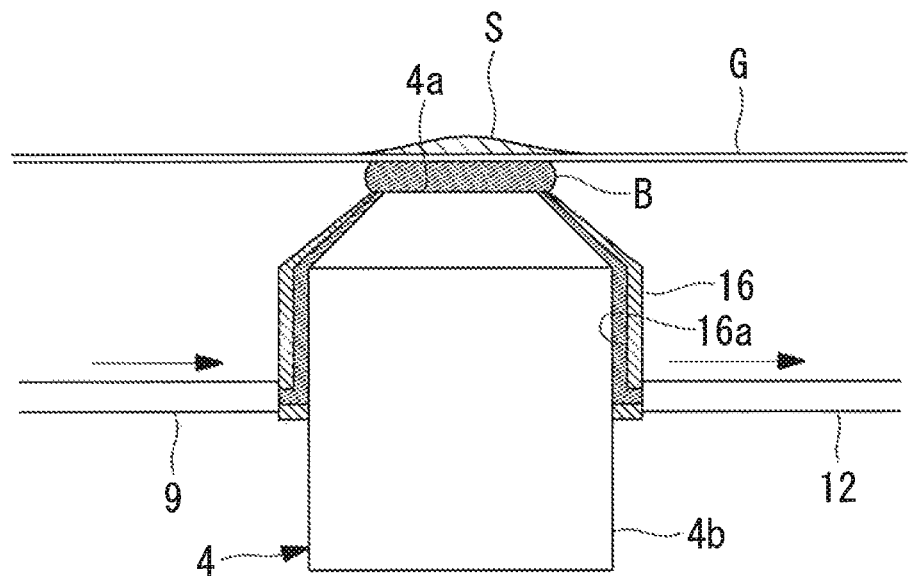
FIG. 4 is a partially enlarged view of near an immersion objective lens and a mounting part of a second variation of the microscope shown in FIG. 1.

In the present embodiment, although the supply nozzle 7 and the suction nozzle 8 to be arranged close to the immersion objective lens 4 are provided separately, instead of the arrangement above, as shown in FIG. 4, a cylindrical gap 16a is formed between a cylindrical cap 16 with which a case 4b of the immersion objective lens 4 is covered and an outer face of the case 4b of the immersion objective lens 4 so that the immersion medium B may be supplied and sucked from an opening provided all around the outside in a radial direction of the top face 4a of the immersion objective lens 4 through the gap. In this manner, it is possible to reliably supply the immersion medium B to the immersion objective lens 4 and suck the immersion medium B therefrom.

In addition, two or more respective supply nozzles 7 and suction nozzles 8 may be provided, and the nozzles may be arranged in a position relation other than 180°.

Further, although the supply pump 11 connected to the supply nozzle 7 and the suction pump 14 connected to the suction nozzle 8 are provided separately, instead of the pumps, a shared pump may be used for both of the pumps. In this case, a peristaltic pump is available.

Figure 5:
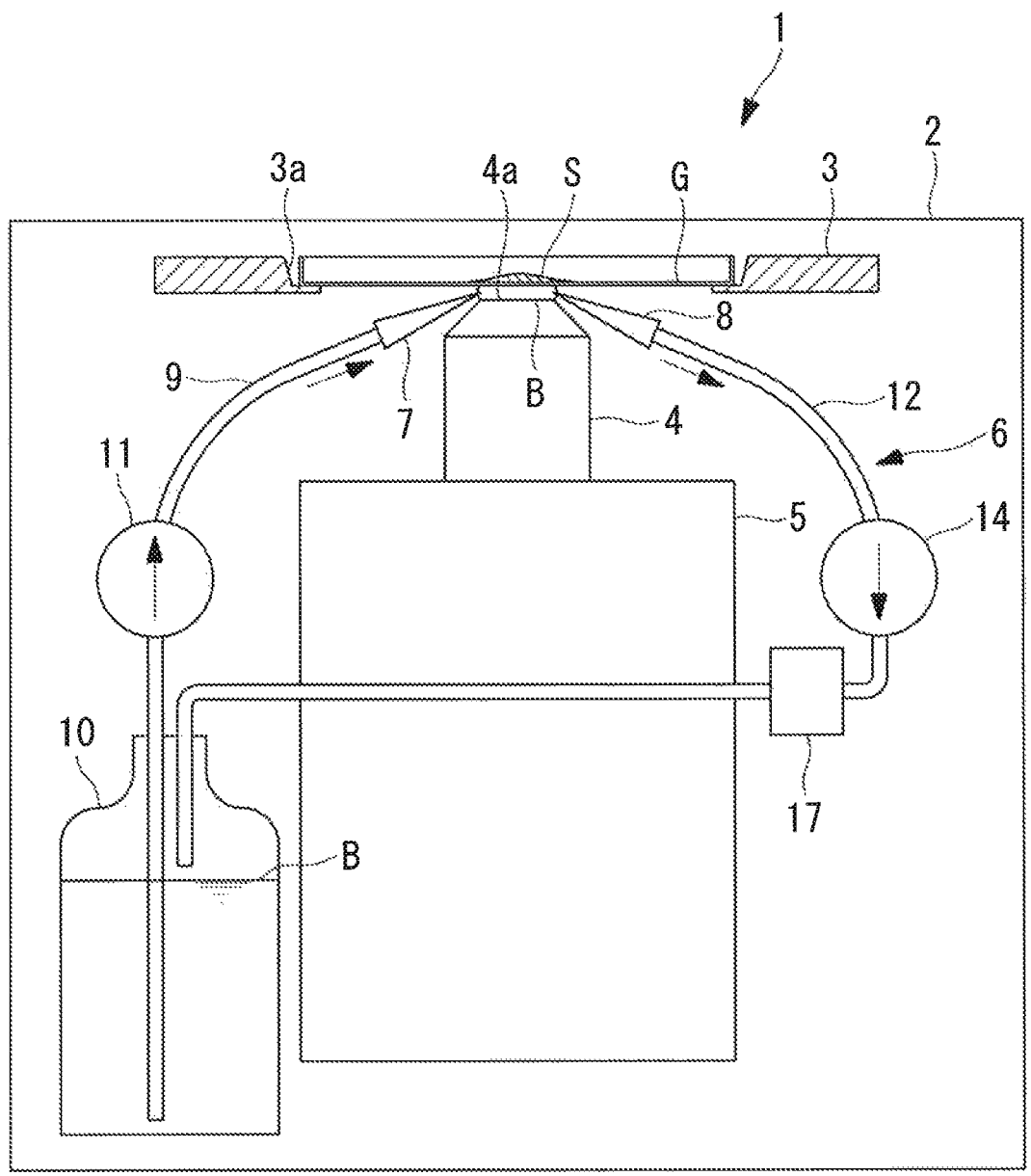
FIG. 5 is a schematic diagram showing a third variation of the microscope shown in FIG. 1.

Although the liquid supply container 10 and the waste liquid container 13 are provided separately, as shown in FIG. 5, a shared liquid supply container 10 may be used for both of the containers. In this case, a filter is shown in FIG. 5 with a reference numeral 17, so that the immersion medium B sucked should be returned to the liquid supply container 10 after filtered by the filter 17.

Thus, in the embodiment above, there may be provided supply part that is connected to the supply port and that supplies an immersion medium to the gap between the mounting part and the immersion objective lens through the supply port, and suction part that is connected to the suction port and that sucks the immersion medium through the suction port.

In this manner, the immersion medium is supplied to the gap between the mounting part and the immersion objective lens through the supply port by operation of the supply part, and the immersion medium is sucked by operation of the suction part.

In addition, in the embodiment above, there may be provided a control unit that controls the supply part and the suction part to be simultaneously driven so that the immersion medium flows.

In this manner, it is possible to allow the immersion medium to flow in the gap between the mounting part and the immersion objective lens to prevent a bubble and the like from staying in the gap by simultaneously performing supply of the immersion medium by the supply part and suction of the immersion medium by the suction part by operation of the control unit.

Further, in the embodiment above, the control unit may control the supply part and the suction part so that the immersion medium held in the gap between the mounting part and the immersion objective lens increases by a predetermined amount per unit of time.

In this manner, the control unit controls the supply part and the suction part to supply the immersion medium so that the immersion medium increases by a predetermined amount per unit of time after the immersion medium is completely removed from the gap between the mounting part and the immersion objective lens temporarily. As a result, it is possible to precisely control the amount of the immersion medium held in the gap between the mounting part and the immersion objective lens by only controlling time.

REFERENCE SIGNS LIST

B immersion medium
G mounting part
S specimen
1 microscope
3 stage
4 immersion objective lens
6 medium supply-discharge device
7 supply nozzle (supply port)
8 suction nozzle (suction port)
11 supply pump (supply part)
14 suction pump (suction part)
15 control unit

The invention claimed is:

1. A method of using a microscope for observing a specimen loaded on a film-like mounting part mountable on a stage, the microscope comprising: a supply port which is adapted to be positioned to supply an immersion medium to a gap between the film-like mounting part mounted on the stage and an immersion objective lens which is arranged facing upward at a lower side of the stage; a suction port which is adapted to be positioned to contact the immersion medium suppliable from the supply port and to suck the immersion medium; a supply unit which is connected to the supply port and which is adapted to supply the immersion medium to the gap between the film-like mounting part and the immersion objective lens through the supply port; and a suction unit which is connected to the suction port and which is adapted to suck the immersion medium through the suction port, the method comprising:
 operating the suction unit to suck a whole amount of the immersion medium provided in the gap between the film-like mounting part and the immersion objective lens; and
 operating the supply unit to supply a predetermined amount of the immersion medium to the gap between the film-like mounting part and the immersion objective lens.

2. A microscope for observing a specimen loaded on a film-like mounting part mountable on a stage, the microscope comprising:
 a supply port which is adapted to be positioned to supply an immersion medium to a gap between the film-like mounting part mounted on the stage and an immersion objective lens which is arranged facing upward at a lower side of the stage;
 a suction port which is adapted to be positioned to contact the immersion medium suppliable from the supply port and to suck the immersion medium;
 a supply unit which is connected to the supply port and which is adapted to supply the immersion medium to the gap between the film-like mounting part and the immersion objective lens through the supply port;
 a suction unit which is connected to the suction port and which is adapted to suck the immersion medium through the suction port; and
 a control unit which is adapted to drive the supply unit and the suction unit,
 wherein the control unit is adapted to operate the suction unit to suck a whole amount of the immersion medium provided in the gap between the film-like mounting part and the immersion objective lens, and thereafter, operate the supply unit to supply a predetermined amount of the immersion medium to the gap between the film-like mounting part and the immersion objective lens.

3. A non-transitory computer-readable recording medium storing a program of a microscope for observing a specimen loaded on a film-like mounting part mountable on a stage, wherein the microscope comprises: a supply port which is adapted to be positioned to supply an immersion medium to a gap between the film-like mounting part mounted on the stage and an immersion objective lens which is arranged facing upward at a lower side of the stage; a suction port which is adapted to be positioned to contact the immersion medium suppliable from the supply port and to suck the immersion medium; a supply unit which is connected to the supply port and which is adapted to supply the immersion medium to the gap between the film-like mounting part and the immersion objective lens through the supply port; and a suction unit which is connected to the suction port and which is adapted to suck the immersion medium through the suction port, the program causing a computer of the microscope to perform functions comprising:
 operating the suction unit to suck a whole amount of the immersion medium provided in the gap between the film-like mounting part and the immersion objective lens; and
 operating the supply unit to supply a predetermined amount of the immersion medium to the gap between the film-like mounting part and the immersion objective lens.

* * * * *